US010042527B2

(12) United States Patent
Seuthe

(10) Patent No.: US 10,042,527 B2
(45) Date of Patent: Aug. 7, 2018

(54) METHOD FOR DISPLAYING AND NAVIGATING CALENDAR EVENTS IN A COMPUTER SYSTEM HAVING A GRAPHICAL USER INTERFACE

(71) Applicant: Ulrich Seuthe, Wetter (DE)

(72) Inventor: Ulrich Seuthe, Wetter (DE)

( * ) Notice: Subject to any disclaimer, the term of this patent is extended or adjusted under 35 U.S.C. 154(b) by 208 days.

(21) Appl. No.: 14/439,391

(22) PCT Filed: Oct. 29, 2013

(86) PCT No.: PCT/EP2013/003248
§ 371 (c)(1),
(2) Date: Apr. 29, 2015

(87) PCT Pub. No.: WO2014/067647
PCT Pub. Date: May 8, 2014

(65) Prior Publication Data
US 2015/0268823 A1 Sep. 24, 2015

Related U.S. Application Data

(60) Provisional application No. 61/719,717, filed on Oct. 29, 2012.

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0485* (2013.01); *G06F 3/04815* (2013.01); *G06Q 10/109* (2013.01); *G06F 15/0266* (2013.01)

(58) Field of Classification Search
CPC ............. G06F 15/0266; G06F 3/04815; G06F 3/04842
See application file for complete search history.

(56) References Cited

U.S. PATENT DOCUMENTS 5,977,974 A * 11/1999 Hatori ................... G06F 3/0481
707/E17.01
6,005,578 A * 12/1999 Cole ................... G06F 3/04815
715/854

(Continued)

OTHER PUBLICATIONS

Bederson et al., "DataLens: A Fisheye Calendar Interface for PDAs", Mar. 2004, ACM, ACM Transactions on Computer-Human Interaction, vol. 11, No. 1, pp. 90-119.*

(Continued)

*Primary Examiner* — Nicholas Klicos
(74) *Attorney, Agent, or Firm* — Fay Sharpe LLP

(57) ABSTRACT

A computer system having a graphical user interface that includes a display and a user interface selection device. The computer system includes a method of displaying and navigating calendar events. The method includes selecting an initial calendar time period for display; selecting initial time units; displaying a band looped around an axis from a point of view located on the axis wherein the band depicts the time units and the calendar events on the side facing the axis in chronological order; and using the user interface selection device to receive navigation commands moving the view point along the axis and/or rotating the band around the axis.

16 Claims, 3 Drawing Sheets

(51) Int. Cl.
   *G06F 3/0481*   (2013.01)
   *G06Q 10/10*    (2012.01)
   *G06F 3/0485*   (2013.01)
   *G06F 15/02*    (2006.01)

(56) References Cited

U.S. PATENT DOCUMENTS

| | | | |
|---|---|---|---|
| 7,481,012 B1* | 1/2009 | Servoss | G09D 3/10 40/109 |
| 7,607,150 B1* | 10/2009 | Kobayashi | G06F 3/0482 348/206 |
| 2002/0054158 A1* | 5/2002 | Asami | G06F 3/04815 715/838 |
| 2005/0060667 A1* | 3/2005 | Robbins | G06T 11/206 715/848 |
| 2005/0091596 A1* | 4/2005 | Anthony | G06F 3/04815 715/712 |
| 2005/0105397 A1* | 5/2005 | Tuason | G04B 19/262 368/21 |
| 2007/0060205 A1 | 3/2007 | Kim | |
| 2007/0120856 A1 | 5/2007 | De Ruyter et al. | |
| 2008/0209546 A1* | 8/2008 | Kim | G06F 3/0482 726/19 |
| 2010/0020048 A1* | 1/2010 | Narita | G06F 3/04815 345/204 |
| 2010/0157742 A1 | 6/2010 | Relyea et al. | |
| 2010/0162170 A1* | 6/2010 | Johns | G04G 9/06 715/834 |
| 2011/0070924 A1* | 3/2011 | Kim | G06Q 10/02 455/566 |
| 2011/0110605 A1* | 5/2011 | Cheong | H04N 5/23238 382/284 |
| 2011/0200980 A1* | 8/2011 | Takahashi | G06F 9/4446 434/365 |
| 2013/0151966 A1* | 6/2013 | Neuman | G06F 3/0482 715/716 |
| 2013/0332871 A1* | 12/2013 | Bucur | G06T 19/00 715/768 |
| 2014/0365969 A1* | 12/2014 | Lee | G06F 3/0482 715/834 |
| 2015/0143303 A1* | 5/2015 | Sarrazin | G06F 3/0482 715/854 |
| 2015/0309675 A1* | 10/2015 | Blinov | G06F 3/0482 715/834 |
| 2016/0048996 A1* | 2/2016 | Nakao | G06Q 10/109 345/419 |

OTHER PUBLICATIONS

Mackinlay et al., "Developing Calendar Visualizers for the Information Visualizer", Nov. 4, 1994, UIST '94, pp. 109-118.*
International Search Authority, International Search Report and Written Opinion for corresponding PCT Application No. PCT/EP2013/003248 (dated Apr. 10, 2014).

* cited by examiner

METHOD FOR DISPLAYING AND NAVIGATING CALENDAR EVENTS IN A COMPUTER SYSTEM HAVING A GRAPHICAL USER INTERFACE

BACKGROUND OF THE INVENTION

The invention relates to electronic calendar systems, and more particularly to methods for displaying and navigating calendar events in a computer system, as well as to a user interface for an electronic calendar.

Computer based calendar systems are an efficient and well established organizational tool for both business and private use. One example of a complex and powerful computer based calendar system is the Microsoft Outlook calendar, see e.g. US 2008/0244425 A1. The calendar associates events, e.g. appointments, with time, and displays a time section, usually a day, a week, or a month, on a graphical display, together with the events associated with this time section. For example, the calendar shows a number of rows, each row divided into seven days, and each day having displayed thereupon an entry or symbol for an event like an appointment or task scheduled for that day.

While the known calendar is a powerful tool, it is limited in terms of navigation and overview. Only a small section of time can be displayed at once, and the larger the section of time for display, the smaller is the space that is available to display all events. The time display is discontinuous and divided into separately depicted days or weeks. It is thus not possible to plan or display events that are spaced far away in time, say a couple of months, or visualize their time respective relationship, and due to the discontinuous nature of the display the time relation between time units is not intuitively recognizable.

It is therefore an object of the invention to overcome the drawbacks of the prior art calendars.

SUMMARY OF THE INVENTION

The invention provides, in a computer system having a graphical user interface including a display and a user interface selection device, a method of displaying and navigating calendar events, the method comprising: selecting an initial calendar time period for display; selecting initial time units; displaying a band looped around an axis from a point of view located on the axis, the band depicting the time units and the calendar events on the side facing the axis in chronological order; and using the user interface selection device to receive navigation commands moving the view point along the axis and/or rotating the band around the axis. The band is preferably looped around a cylinder surface and the view point is inside the cylinder.

The invention thus overcomes the disadvantages of the prior art. A long period of time can be displayed and viewed from a selectable point in time, with the calendar entries close in time being larger than those that are further away in time. Navigation through the calendar is possible by moving along an axis, and the band can be rotated additionally if desired. The "walk in calendar" allows intuitive navigation and time perception.

The invention is particularly suitable for navigation with gestures, such as moving a finger across a touch sensitive display for moving the point of view along the axis.

A band denotes herein a consecutive arrangement of items, identical in size or different in size, with separation or without separation therebetween, such that the arrangement at least loosely resembles a band.

The term walk-in denotes herein the possibility to view the band from within, by moving a viewpoint, from which the three dimensional graphical depiction is rendered, insider the calendar band, for instance—but not limited to—along an axis around which the band is looped.

The loops may be regular or irregular, both in spacing and radius. The diameter of the band may vary, but is preferably constant.

Further aspects, features and embodiments of the invention will become apparent from the exemplary description with reference to the attached drawings, as well as from the appended claims.

DETAILED DESCRIPTION OF PREFERRED EMBODIMENTS

In a conventional computer system having a graphical user interface including a display and a user interface selection device, e.g. a Personal Computer with a monitor and a keyboard and mouse, or a smartphone or tablet computer having a touch sensitive display, a program stores events like appointments and tasks and associates them to a point or period in time. For instance, a task to phone a client is associated with a year, month, day, hour, and minute, and holidays are associated with a time period starting at a first year, month, day and extending until a second year, month, day.

Figure 1:
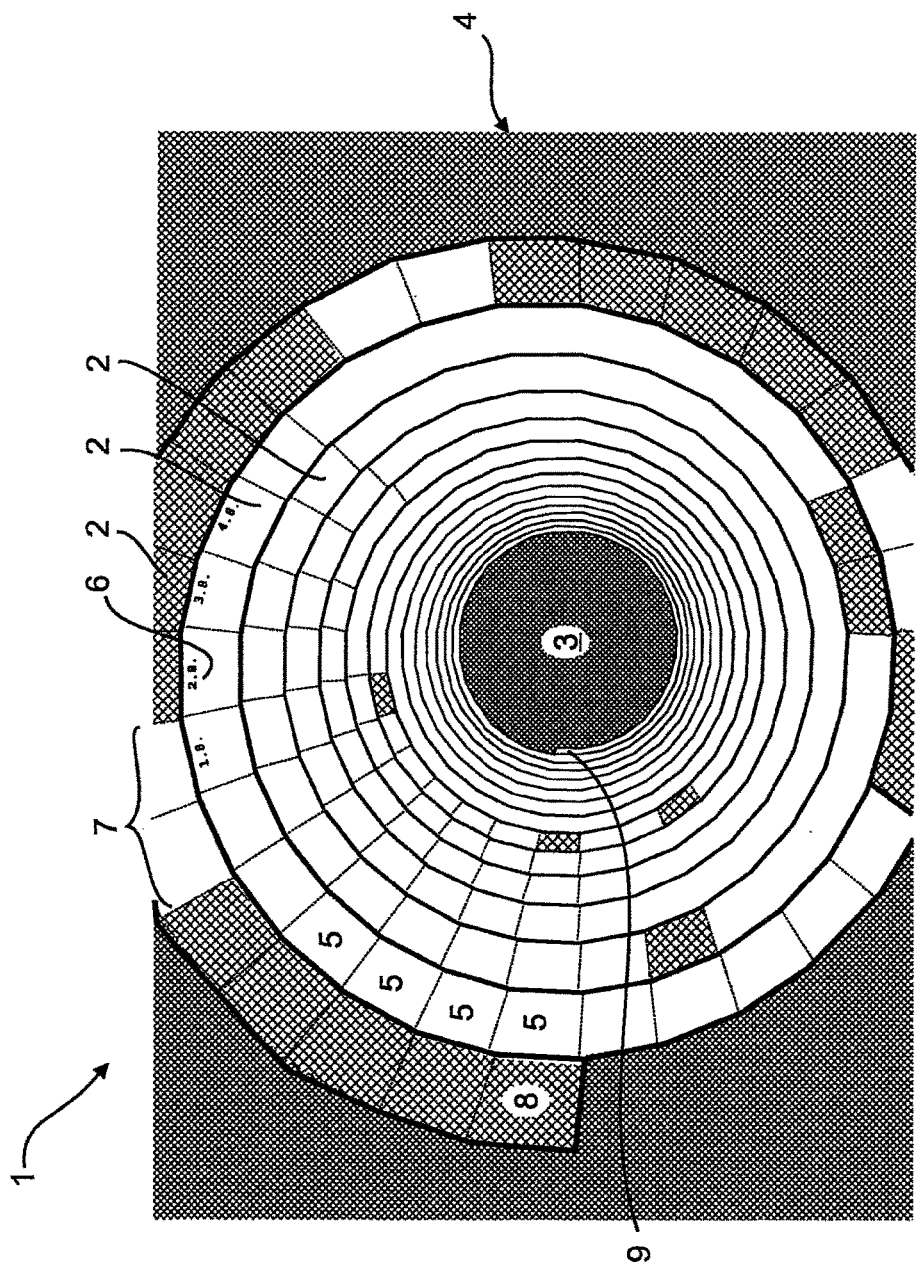
FIG. 1 illustrates a calendar.

The invention provides an intuitive display of and navigation through such calendar events. In FIG. 1, time flows along a band 1 arranged in loops 2 around an axis 3 and forming a cylindrical surface, and the band 1 is displayed in a three dimensional projection onto a two dimensional display 4 from a point of view that is on the axis 3 in front of the display 4. The band 1 is divided into time units 5, here days, each time unit 5 having at least one marking 6 there-upon for the designation of the day or the date or of an event like a task or an appointment, if applicable. Color can be used to mark time units 5, e.g. week-ends 7 may be colored identically—and ideally different from weekdays— and are preferentially aligned parallel to the axis 3.

The point of view may be moved by the user through the user interface selection device, e.g. by sliding a finger from the bottom to the top of the touch sensitive display 4 in order to move into the future, and from the top to the bottom to move into the past. The band 1 can be rotated clockwise or counterclockwise, e.g. by placing two fingers onto the touch sensitive surface of display 4 and rotating them clockwise or counterclockwise.

Figure 2:
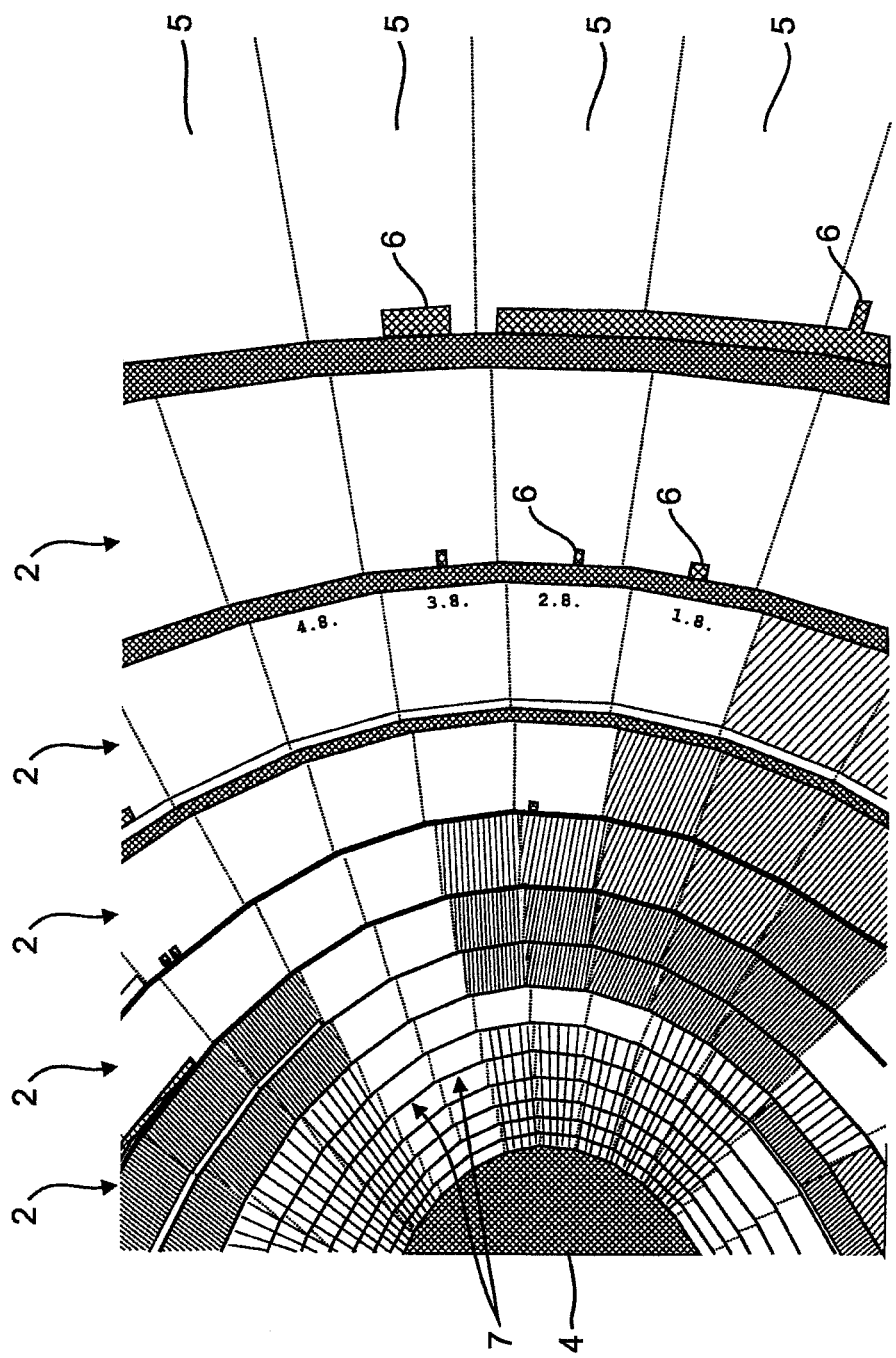
FIG. 2 illustrates the calendar of FIG. 1 from an off-axis position.

Navigation is not restricted along the axis 3, and the direction of view is not restricted along the axis 3. An off-axis position with a direction of view towards the band is illustrated in FIG. 2. This allows the user to walk through the calendar, to look at those events or time units or time periods of particular interest and at the same time keep an overview of the larger time context.

The band 1 can have a starting point 8 and/or an end point 9 as depicted in FIG. 1, or be endless.

Figure 3:
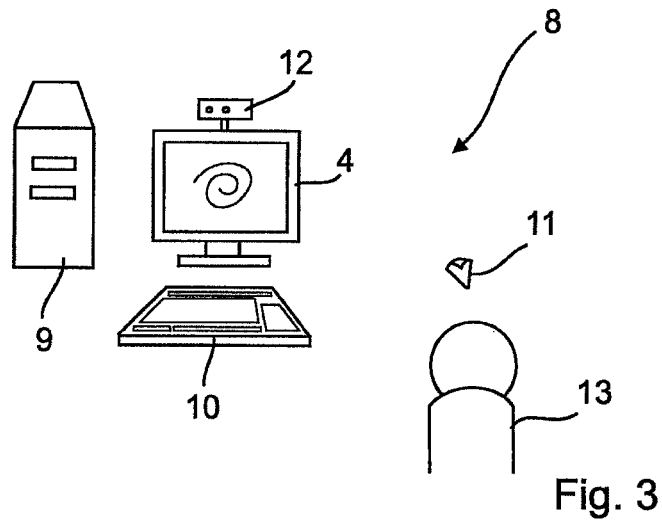
FIG. 3 illustrates a computer system.

The invention is intended for a computer system 8, see FIG. 3, such as a personal computer 9 having a keyboard 10 and a mouse 11 and/or another input device, e.g. a camera 12 capable of obtaining e.g. hand based gestures of a user 13.

If used in a computer system 8 having a touch screen, e.g. a tablet computer or a mobile phone, the input device may be the touch screen. Certain commands may be associated with certain actions, e.g. moving a finger in circles, in particular clock-wise, may turn the band around the axis such that the calendar advances in time, and vice versa for an anti-clockwise circling movement. Movement of a finger in the plane of the touchscreen may be used to move the view point in the x-y-plane.

Figure 4A:
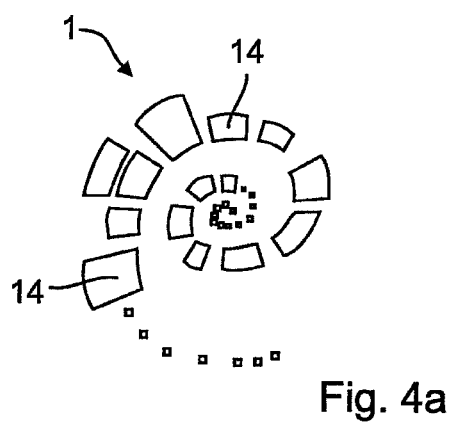
FIG. 4 illustrates different bands.
Figure 4B:
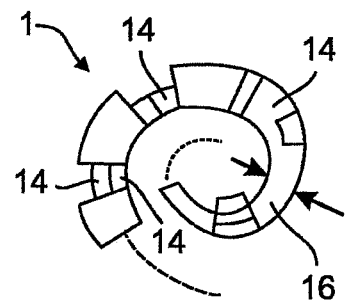

FIG. 4 illustrates different bands. The band in FIG. 4a has elements 14 which differ in size and are spaced apart, i.e. the band 1 is discontinuous. The band in FIG. 4b has elements 15 which are not spaced apart, i.e. the band 1 is continuous.

Figure 5:
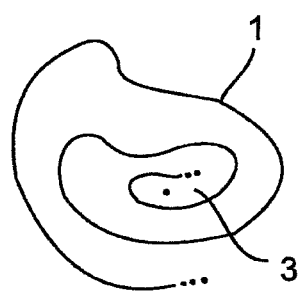
FIG. 5 illustrates different loops.

The loops may be regular, as in FIGS. 1 and 2, or irregular, both in spacing and radius, as illustrated in FIG. 5. The diameter 16 of the band may vary, but is preferably constant.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

The invention claimed is:

1. A method for using a computer system having a graphical user interface including a display and a user interface selection device so as to enable a user to input, display and navigate stored calendar events, the method comprising:
   using said user interface selection device to select an initial calendar time period for display;
   using said user interface selection device to select initial time units;
   displaying on said display a band looped around an axis from a point of view located on the axis that is partially created from the stored calendar events to form a three-dimensional conical display onto the two-dimensional display that represents a conical time representative display wherein images on the band are largest at a beginning of the band and the images decrease in size along a length of the band, the band depicting the time units and the calendar events based on said selections made using said user interface selection device, said band depicting the time units and the calendar events on the side facing the axis in chronological order, the band is looped around a conical-shaped cylinder surface and the view point is from inside the cylinder, said band including visual indicators to differentiate portions of the band that include calendar events from portions of the band that are absent calendar events; and
   using the user interface selection device to move the view point along the axis, rotating the band around the axis, and to select a particular calendar event on the band.

2. The method of claim 1, wherein the band includes a start point and an end point.

3. The method of claim 1, wherein a portion of the band between a first point in time and a second point in time is displayed.

4. The method of claim 1, wherein adjacent loops are spaced apart.

5. The method of claim 1, wherein the time units are days and one loop corresponds to one week.

6. The method of claim 1, wherein the time units are days and one loop corresponds to one month.

7. The method of claim 1, wherein the calendar events are selectable by the user and a selection of the calendar events opens a program associated with the type of the calendar event.

8. The method of claim 1, wherein the view point movement is restricted to a linear movement into and out of the looped band.

9. A computer system, comprising:
   a graphical user interface including:
   at least one electronic processor;
   a display; and
   a user interface selection device,
   wherein the display is configured to graphically display a calendar, the user interface selection device is configured to enable a user to input, display and navigate stored calendar events, characterized in that the calendar is created and displayed in a form of a band looped around an axis, the band depicting time units and at least one calendar event on the side of the band facing the axis to form a three-dimensional conical display onto the two-dimensional display that represents a conical time representative display wherein images on the band are largest at a beginning of the band and the images decrease in size along a length of the band, the band is looped around a conical-shaped cylinder surface and the view point is from inside the cylinder, said band including visual indicators to differentiate portions of the band that include calendar events from portions of the band that are absent calendar events, said computer system configured to receive navigation commands from a user via the user interface selection device, and to graphically display the calendar with a view point changed according to the navigation commands, the user interface selection device configured to enable the user move the view point along the axis, rotating the band around the axis, and to select a particular calendar event on the band.

10. The computer system of claim 9, configured to translate a navigation command into a movement of the view point along the axis.

11. The computer system of claim 9, configured to translate a navigation command into a rotation of the band around the axis.

12. The computer system of claim 9, configured to display a time unit of the calendar, an event, and/or data associated with the calendar, in response to one or more user inputs via a user interface.

13. The computer system of claim 9, comprising one of a personal computer, a mobile phone, a tablet, or a laptop.

14. The computer system of claim 9, wherein the user interface selection device is at least one of:
- a mouse having one or more buttons configured for pressing by a user, the pressing of one of the buttons constituting a user input;
- a keyboard having one or more keys configured for pressing by the user, the pressing of one of the keys constituting a user input;
- a camera configured to obtain gestures of the user, the gestures constituting a user input; and
- a touch sensitive surface covering all or at least a portion of the display configured to receive movements by the user, the movements constituting a user input;

wherein the at least one electronic processor is configured to:
- receive one or more user inputs from the user interlace selection device;
- process the received user inputs as the navigation command; and
- alter the view point of the calendar on the display based on the navigation command.

15. The computer system of claim 14, wherein the events are selectable by the user via the user interface selection device and a selection of an event of the calendar events causes the at least one electronic processor to open a program associated with the type of the event.

16. The computer system of claim 9, wherein the at least one electronic processor is configured to control the display of the graphical user interface to display a portion of the band between a first point in time and a second point in time.

\* \* \* \* \*